Oct. 30, 1956 K. L. NEUMANN ET AL 2,769,089
RADIO TRANSMITTER WITH AUTOMATIC DRIVE CONTROL
Filed March 12, 1953
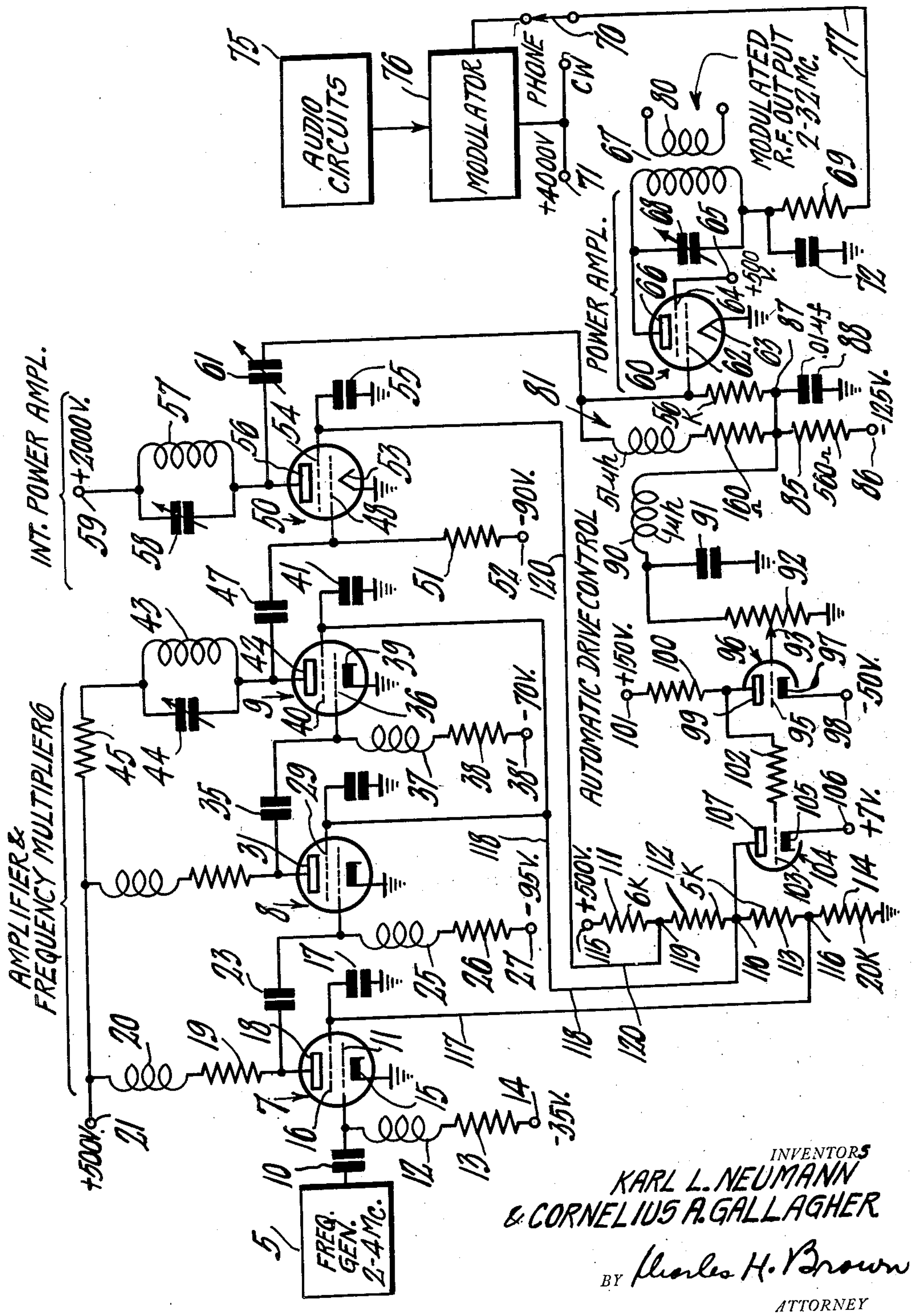
INVENTORS
KARL L. NEUMANN
& CORNELIUS A. GALLAGHER
BY Charles H. Brown
ATTORNEY United States Patent Office 2,769,089

Patented Oct. 30, 1956

2,769,089

RADIO TRANSMITTER WITH AUTOMATIC DRIVE CONTROL

Karl L. Neumann, Yonkers, and Cornelius A. Gallagher, Hicksville, N. Y., assignors to Radio Corporation of America, a corporation of Delaware Application March 12, 1953, Serial No. 341,906

11 Claims. (Cl. 250—36)

This invention relates to radio transmitters, and more particularly to means for automatically controlling drive or excitation applied to the power amplifier stage of the transmitter.

The present invention is particularly useful in a radio transmitter designed to generate a radio-frequency signal at any one of many different frequencies, for example, any frequency in the range of from 2 to 30 megacycles. In such a transmitter there are many circuits which must be capable of adjustment in frequency over a wide range to provide any desired output frequency. In addition to providing for frequency adjustment of many circuits in the transmitter, it is usually desirable to maintain the radio-frequency output power, which is radiated from an antenna, at a constant high level regardless of the particular frequency of operation selected. Very elaborate and complicated circuits have been necessary to provide a constant radio-frequency output level when the frequency of operation is varied over a broad range. It is therefore a principal object of this invention to provide a simple automatic means to maintain a substantially constant level of radio-frequency output over a wide range of output frequency.

It is another object to provide an improved system of maintaining the excitation applied to a power amplifier at a substantially constant value.

According to an embodiment of the invention, the output of a frequency generator is amplified and multiplied in a chain of vacuum tube circuits and applied to the grid of a power amplifier tube. The output of the power amplifier tube is fed to an antenna structure from which the radio-frequency energy is radiated to distant points. The grid circuit of the power amplifier tube includes a grid resistor through which grid current flows in proportion to the magnitude of the signal applied to the grid. A portion of the voltage developed across the grid resistor is amplified and used to control the gain of the chain of vacuum tube circuits. In this way the magnitude of the driving signal applied to the grid of the power amplifier and the output of the power amplifier are maintained at a substantially constant value.

These and other objects, advantages and aspects of the invention will be apparent to those skilled in the art from the following detailed description of the invention taken together with the appended drawing wherein there is illustrated a circuit diagram, partly in block form, of a radio transmitter including an automatic drive control.

Referring to the drawing, a frequency generator 5 produces low-level electrical oscillations the frequency of which is very accurately controllable. The output of frequency generator 5 is applied to a three-stage amplifier and frequency multiplier 6 including tetrode vacuum tubes 7, 8 and 9 coupled in cascade. The output of generator 5 is coupled through capacitor 10 to the grid 11 of tube 7. Grid 11 is connected through an R. F. choke coil 12 and a grid resistor 13 to the negative terminal 14 of a source of unidirectional current (not shown). The positive terminal of the source is connected to ground. Cathode 15 is connected to ground. Screen grid 16 is by-passed to ground through capacitor 17. Plate 18 is connected through a load resistor 19 and an R. F. choke coil 20 to the positive terminal 21 of a source of unidirectional current (not shown). The negative terminal of the source is connected to ground.

The plate 18 of first multiplier tube 7 is coupled through capacitor 23 to a second multiplier tube 8 forming part of a similar circuit. The plate 31 of tube 8 is coupled through capacitor 35 to the control grid 36 of third multiplier tube 9. Grid 36 is connected through an R. F. choke 37 and grid resistor 38 to a negative terminal 38' of a source of unidirectional current (not shown). Cathode 39 is connected to ground. Screen grid 40 is by-passed to ground through a capacitor 41. Plate 42 is connected through a tank circuit consisting of inductor 43 and capacitor 44, and a dropping resistor 45 to the positive terminal 21.

Plate 42 of a third multiplier vacuum tube 9 is coupled through capacitor 47 to the control grid 48 of intermediate power amplifier vacuum tube 50. Grid 48 is connected through a grid resistor 51 to the negative terminal 52 of a source of unidirectional current. Filament 53 is connected to ground. Screen grid 54 is by-passed to ground through capacitor 55. Plate 56 is connected through a tank circuit consisting of inductor 57 and capacitor 58 to the positive terminal 59 of a source of unidirectional potential.

The output of intermediate power amplifier tube 50 is coupled to the input of a power amplifier vacuum tube 60 by a coupling from plate 56 through capacitor 61 to the control grid 62 of tube 60. Filament 63 is connected to ground. Screen grid 64 is connected to the positive terminal 65 of a source of unidirectional current. Plate 66 is connected through a tank circuit, including inductor 67 and capacitor 68, and an isolation resistor 69 to a source of D. C. high voltage. The connection to this last source is through switch 70 to the positive terminal 71 of a source of unidirectional current when the transmitter is operated to send a keyed continuous wave. The connection is through switch 70 to a modulator 76 for phone transmission. Audio frequency signals carrying the intelligence to be transmitted are generated in audio circuits 75 and applied to a modulator 76. The high level output of modulator 76 is applied to the plate circuit of power amplifier tube 60 by way of lead 77 to modulate the radio-frequency signal with the audio-frequency intelligence. A modulated R. F. output from the power amplifier is obtained from an inductor 80 electromagnetically coupled to tank inductor 67, and is conveyed to an antenna (not shown) from which the signal is radiated in space to distant points.

Grid 62 of power amplifier tube 60 is connected to a grid network 81 across which the radio-frequency signal from intermediate power amplifier tube 50 is developed, and through a grid bias resistor 85 to a negative terminal 86 of a source of unidirectional current. Intermediate point 87 is by-passed to ground for radio frequencies through capacitor 88. Power amplifier tube 60 is biased for class C operation.

The point 87 is connected through an isolating network, consisting of an R. F. choke coil 90 and a capacitor 91, which blocks the R. F. energy, to a potentiometer 92. A tap 93 on the potentiometer is connected to the grid 95 of a first automatic drive control tube electrode structure 96. The cathode 97 is connected to the negative terminal 98 of a source of unidirectional current. The plate 99 is connected through a load resistor 100 to the positive terminal 101 of a source of unidirectional current, and through a coupling resistor 102 to the grid 103 of a second automatic drive control tube electrode structure 104. Electrode structures 96 and 104 may be located in separate evacuated envelopes or in a common evacuated envelope. The plate 107 is connected to a point 110 on a voltage divider including resistors 111, 112, 113 and 114 connected in series between the positive terminal 115 of a source of unidirectional current and ground. Point 116 between resistors 113 and 114 is connected over lead 117 to the screen grid 16 of first multiplier tube 7. Point 110 between resistors 112 and 113 is connected over lead 118 to the screen grid 29 of second multiplier tube 8 and screen grid 40 of third multiplier tube 9. Point 119 is connected over lead 120 to the screen grid 54 of intermediate power amplifier tube 50.

The operation of the circuit will now be described. Oscillation of a certain frequency within a range such as from 2 to 4 megacycles is generated in frequency generator 5. The output of frequency generator 5 is applied to amplifier and frequency multiplier 6 including tubes 7, 8 and 9. The circuits of tubes 7 and 8 are designed to amplify signals over a wide range of frequencies, such as from the range of 2 to 16 megacycles. Amplifier tube 7 is biased to provide a high degree of amplification for the output of frequency generator 5. Tube 8 is biased so that its output includes strong harmonic frequency components. The plate circuit of tube 9 includes a tank 43, 44 which may be tuned to any frequency over a wide band such as any frequency between 2 and 32 megacycles. The tank is tuned to the same frequency as that supplied by frequency generator 5, or is tuned to a frequency harmonically related with that supplied by frequency generator 5. For example, if frequency generator 5 provides an output frequency of 3 megacycles, tank 43, 44 may be tuned to 3 megacycles, or 6 megacycles, or 12 megacycles or 24 megacycles. It is apparent that the output of amplifier and frequency multiplier 6 may be an oscillation having any frequency, in the present example, between 2 and 32 megacycles.

The output of amplifier and multiplier 6 is applied to the control grid of an intermediate power amplifier tube 50. The plate circuit of tube 50 includes a tank 57, 58 which is tuned to the same frequency as tank 43, 44 of the preceding stage. The tubes 7, 8, 9 and 50 constitute an amplifier for the output of frequency generator 5. In addition to providing amplification, tubes 7, 8 and 9 may also function as a frequency multiplier. The amount of amplification effected in each of the tubes 7, 8, 9 and 50 is controlled by the amount of positive potential applied to the respective screen grids. The positive biasing potentials are obtained from a voltage divider including resistors 111, 112, 113 and 114. A source of unidirectional current is connected across this voltage divider, and taps thereon are connected to the several screen grids.

The output of intermediate power amplifier tube 50 is applied to the control grid 62 of power amplifier tube 60 and across an impedance network 81 which provides an appropriate output impedance for the intermediate power amplifier over a broad range of frequency. A source of negative grid bias potential is connected through bias resistor 85 and impedance network 81 to the grid of the power amplifier tube. The negative bias potential is of sufficient value to maintain the power amplifier tube 60 in the nonconductive condition in the absence of a radio frequency signal from intermediate power amplifier tube 50. During portions of the positive half-cycle of radio frequency signal applied to grid 62, the grid draws current through resistor 85 and network 81 to the grid. This produces a voltage drop across resistor 85 which makes point 87 more negative in proportion to the amount of grid current drawn. The greater the amplitude of the signal applied from intermediate power amplifier tube 50 to the grid of power amplifier tube 60, the greater the grid current drawn by tube 60 and the more negative the potential developed at point 87.

A portion of the self-bias potential developed in the grid circuit of power amplifier tube 60 is taken from the tap or point 87 and applied through a radio frequency blocking circuit 90, 91 to a potentiometer 92. A tap 93 on potentiometer 92 connects a proportional voltage to grid 95 of automatic drive control tube 96. Tubes 96 and 104 are connected to form a direct-current amplifier. Tube 96 is biased to be normally conductive in the absence of a radio frequency signal applied to the grid of power amplifier tube 60 and in the absence of the resulting negative self-bias potential. When a high amplitude radio frequency is applied to power amplifier tube 60 the resulting negative potential applied to the grid of control tube 96 causes the potential on the plate 99 to rise. This potential rise is coupled to the grid of second control tube 104 which is biased to be cut off or slightly conductive in the absence of a radio frequency signal applied to power amplifier tube 60. The more positive potential applied to grid 103 of control tube 104 causes the tube to conduct, drawing plate current from positive terminal 115 through resistors 111 and 112. The resulting voltage drop developed across these resistors reduces the potential at point 110. The potentials at taps 119 and 116 are also reduced as a result of the plate current drawn by control tube 104. Since the screen grids of the amplifier tubes 7, 8, 9 and 50 are connected to taps 119, 110 and 116 on the voltage divider, the reduction in the positive potential at these points causes a decrease in the amplification of each of the amplifier tubes. Control tubes 96 and 104 serve to isolate the controlled screen grids from the power amplifier so far as unwanted regenerative oscillations in the control loop are concerned.

The automatic drive control circuit is designed to reduce the amplification in tubes 7, 8, 9 and 50 when the output of intermediate power amplifier tube 50 exceeds a predetermined amplitude. In the absence of the automatic drive control circuit, the output of the intermediate power amplifier would vary widely depending on the particular frequency within the range of 2 to 32 megacycles which is generated and amplified. According to the teachings of this invention, the power amplifier tank 67, 68, the intermediate power amplifier tank 57, 58 and the amplifier and multiplier tank 43, 44 may all be tuned to any frequency which is equal to or a multiple of the frequency supplied by frequency generator 5, and the drive or excitation applied from the intermediate power amplifier to the power amplifier will be maintained at a predetermined constant value. The output amplitude of the power amplifier, is a function of the amplitude of the input thereto, and therefore is maintained at a constant predetermined value.

What is claimed is:

1. In a radio transmitter, the combination of a power amplifier tube having grid and cathode input electrodes, means to bias said tube for class C operation including a source of bias potential and impedance means connected across said input electrodes, a tap on said impedance means and a capacitor connected from said tap to said cathode electrode, a multistage amplifier having output terminals coupled to said input electrodes of said power amplifier tube, said multi-stage amplifier having vacuum tubes with electrodes which may be biased to control the amplification therein, and an electron device drive control circuit coupled between said tap and said electrodes of the tubes in said multi-stage amplifier to control the bias and the amplification thereof.

2. In a radio transmitter, the combination of a power amplifier tube having grid and cathode input electrodes, means to bias said tube for class C operation including a source of bias potential and impedance means connected in series across said input electrodes, a tap on said impedance means and a capacitor connected from said tap to said cathode, a multistage vacuum tube amplifier having output terminals coupled to said input electrodes of said power amplifier tube, said multi-stage vacuum tube amplifier including vacuum tubes having screen grids, and a vacuum tube drive control circuit comprising a direct current amplifier coupled from said tap to the screen grids of the tubes of said multi-stage amplifier to control the bias on the tubes therein and the amplification thereof.

3. In a radio transmitter, the combination of a power amplifier tube having a grid electrode, means to bias said grid electrode including impedance means connected to said grid, a vacuum tube source of radio-frequency oscillations coupled to said grid, said source of oscillations including vacuum tubes with electrodes which may be biased to control the amplification therein, said oscillations being operative to cause a current to flow through said impedance means to said grid during a portion of each cycle, the current being a function of the amplitude of said oscillations, direct current amplifying means to amplify at least a portion of the resulting voltage drop across said impedance means, and means to apply the output of said direct current amplifying means to said electrodes of the vacuum tubes in said source of oscillations to reduce the amplitude of the oscillations therefrom.

4. In a radio transmitter, the combination of a power amplifier tube having grid and cathode input electrodes, means to bias said tube for class C operation including a source of bias potential and impedance means connected across said input electrodes, a tap on said impedance means and a capacitor connected from said tap to said cathode, a driver amplifier for amplifying a signal to be transmitted and having output terminals coupled to said input electrodes of said power amplifier tube to provide a drive therefor, and a drive control circuit comprising a direct current amplifier coupled from said tap to said driver amplifier to automatically bias said driver amplifier to control the amplification therein.

5. The combination of a power amplifier tube, an input circuit for said tube including an impedance network having a first portion across which an alternating current voltage may be developed and a second portion across which a direct current voltage is developed in proportion to the grid current drawn by said tube, a multi-tube amplifier having an output coupled to the first portion of said impedance network, said multi-tube amplifier including vacuum tubes having screen grids, and a direct current amplifier coupling, the second portion of said impedance network to said screen grids in said multi-tube amplifier to control the gain thereof.

6. In a radio transmitter, the combination of a power amplifier tube having grid and cathode input electrodes, means to bias said tube for class C operation including a source of bias potential and impedance means connected in series across said input electrodes, a tap on said impedance means, a capacitor connected from said tap to said cathode electrode, a driver amplifier having an output coupled to said input electrodes of said power amplifier tube, said driver amplifier including vacuum tubes with electrodes adapted to be biased to control the amplification therein, and a drive control circuit comprising a direct current amplifier having an input coupled to said tap on said impedance means and having outputs connected to said electrodes of the vacuum tubes in said driver amplifier.

7. In a radio transmitter, the combination of a power amplifier tube having grid and cathode input electrodes, means to bias said tube for class C operation including a source of bias potential and impedance means connected in series across said input terminals, a tap on said impedance means, a capacitor connected from said tap to said cathode electrode, a driver amplifier having an output coupled to the input electrodes of said power amplifier tube, said driver amplifier including vacuum tubes with electrodes which may be biased to control the amplification therein, a direct current amplifier having an input connected to said tap on said impedance means and having an output connected to said electrodes of the vacuum tube in said driver amplifier, whereby the gain of said driver amplifier is automatically limited.

8. The combination of a power amplifier tube, an input circuit for said tube including an impedance network having a radio frequency portion and a radio frequency by-passed portion, means including said network to bias said tube for class C operation, a multi-tube driver amplifier having an output coupled to said input circuit of said amplifier tube, said multi-tube driver amplifier including vacuum tubes with electrodes which may be biased to control the amplification therein, a direct current amplifier having an input coupled to the radio frequency by-passed portion of said impedance network, the output circuit of said direct current amplifier including a voltage divider having a plurality of taps thereon, and means connecting said taps to respective ones of said electrodes of said vacuum tubes in said multi-tube driver amplifier.

9. The combination of, a radio frequency power amplifier tube including grid and cathode input electrodes, a grid-cathode bias circuit including a grid impedance and a source of bias potential connected in series from said grid electrode to said cathode electrode, a radio frequency by-pass capacitor connected across a portion of said bias circuit, whereby a direct current potential is developed across said portion in accordance with the grid current drawn by said amplifier tube, a multi-tube driver amplifier having an output coupled to the input electrodes of said radio frequency amplifier tube, said driver amplifier including vacuum tubes having screen grid electrodes, a direct current amplifier having an input coupled to said by-passed portion of said bias circuit and having different outputs respectively coupled to the different screen grid electrodes of said driver amplifier.

10. In a radio transmitter, the combination of a radio frequency power amplifier tube including grid and cathode input electrodes, a grid-cathode bias circuit including a grid impedance and a source of bias potential connected in series from said grid electrode to said cathode electrode, a radio frequency by-pass capacitor connected across a portion of said bias circuit, whereby a direct current potential is developed across said portion in accordance with the grid current drawn by said amplifier tube, a multi-tube driver amplifier having an output coupled to the input electrodes of said radio frequency amplifier tube, said driver amplifier including vacuum tubes having screen grid electrodes, a direct current amplifier having an input coupled to said portion of said bias circuit, said direct current amplifier including first and second vacuum tubes connected in cascade, a voltage divider, a source of potential connected across said voltage divider, said second vacuum tube including an anode connected to a point on said voltage divider, and connections from different points on said voltage divider to the screen grids of the tubes in said driver amplifier.

11. In a radio transmitter, the combination of a power amplifier tube having grid and cathode input electrodes, means to bias said tube for class C operation including a source of bias potential and impedance means connected across said input electrodes, a tap on said impedance means and a capacitor connected from said tap to said cathode electrode, a driver amplifier having output terminals coupled to said input electrodes of said power amplifier tube, said driver amplifier having vacuum tubes with electrodes which may be biased to control the amplification therein, and a drive control circuit including a direct current amplifier connected from said tap to said electrodes of the tubes in said driver amplifier to control the amplification in said driver amplifier.

References Cited in the file of this patent

UNITED STATES PATENTS

| | | |
|---|---|---|
| 1,986,597 | Nyman | Jan. 1, 1935 |
| 2,279,128 | Paslay | Apr. 7, 1942 |
| 2,385,211 | Konrad | Sept. 18, 1945 |
| 2,385,212 | Konrad | Sept. 18, 1945 |
| 2,395,770 | Vilkomerson | Feb. 26, 1946 |
| 2,435,547 | Nikis | Feb. 3, 1948 |
| 2,480,842 | Farnsworth | Sept. 6, 1949 |
| 2,521,052 | Edwards | Sept. 5, 1950 |
| 2,537,958 | Berman | Jan. 16, 1951 |
| 2,548,822 | Roberts et al. | Apr. 10, 1951 |
| 2,552,136 | Beurtheret | May 8, 1951 |